Patented May 16, 1939

2,158,446

UNITED STATES PATENT OFFICE 2,158,446

COMPOSITION ADAPTED TO LIBERATE FREE IODINE

Ellis L. Werft, Allentown, Pa.

No Drawing. Application February 1, 1938, Serial No. 188,184

2 Claims. (Cl. 167—53.1)

This invention relates to the administration of iodine to fowl as a preventative against the development of the blackhead and coccidiosis diseases.

Blackhead and coccidiosis are diseases which are common to fowl and which spread rapidly through the flock and causes high mortality. Blackhead is primarily a disease of the intestines and liver, while coccidiosis is largely one of the intestines. Both of these diseases are caused by protozoan parasites which usually find their way into the system of the fowl through the feed or drinking water. Coccidiosis exists in a number of forms depending upon the particular species of coccidia protozoan parasite causing it. Blackhead is most frequently seen as a disease in turkeys, but chickens are also susceptible, whereas coccidiosis is generally observed as a disease in chickens although turkeys, pigeons, geese may be infected with it.

Intravitem tests with iodine have demonstrated that the protozoan parasites causing blackhead and coccidiosis quickly die when subjected to the direct action of a small amount of free iodine. If it were possible to introduce free iodine into the intestines of fowl afflicted with blackhead or coccidiosis in its various stages of development in sufficient amounts to kill the protozoan parasites causing it, this would result in an arrestation and consequent restoration to health of at least a goodly portion of the flock of fowl so treated. Processes for introducing free iodine into the intestinal tract of fowl have heretofore been proposed but such processes have the disadvantage in that they are either too laborious to carry out or cause a result which is dangerous to the health of the fowl.

By the present invention it is possible to introduce free iodine into the intestinal tract of the fowl in a simple, expedient, and safe manner. It has been found that for fowl which already suffer from an attack of the blackhead or coccidiosis diseases, treatment with iodine is of little avail. However, for fowl which show no or only incipient symptoms of the diseases, the administration of iodine is beneficial in that it prevents the initial or further development of such diseases, thus enabling the fowl to recuperate and survive.

Accordingly, the principal object of the present invention is the administration of iodine to fowl as a preventative against the development of the blackhead or coccidiosis diseases.

Another object of the present invention is to provide an iodine liberating composition suitable for administration to fowl which, after administration through the esophagus, will liberate free iodine in sufficient amount to kill the blackhead or coccidia parasites that may be present in the internal organs.

A further object of the present invention is to provide a composition which is adapted to liberate free iodine upon contact with the acidic reagent present in the gastric juices of fowl and which may safely be administered to fowl.

Other objects will be apparent as the invention is described hereinafter in greater detail.

Briefly stated, the composition adapted to liberate free iodine is composed of a mixture consisting of a compound of iodine and an alkali metal and a salt of an alkali metal containing iodine and oxygen.

The composition adapted to liberate free iodine may be produced in a number of ways. One way consists in weighing out 8.05 ounces of solid potassium hydroxide and then adding same to three (3) quarts of water. As soon as all of the potassium hydroxide is dissolved there is added gradually 18.21 ounces of crystalline iodine. The solution after all of the iodine has been added has a dark red color which changes to a lighter shade upon allowing the solution to remain quiescent for a short period of time. At this point, about .5 of an ounce of solid potassium hydroxide is added to the solution, and upon such addition the solution becomes colorless. The resulting solution has associated therewith a white grainy precipitate which is allowed to settle upon the bottom of the receptacle, whereupon the supernatant solution is separated from such precipitate by decantation. To this precipitate a small amount of water is added, and as soon as it has dissolved the original solution is mixed therewith, and water added in an amount to bring the total volume up to a gallon. The solution thus obtained consists of a mixture of an iodide and iodate of potassium. The iodide-iodate solution thus produced is slightly alkaline because of the addition of the .5 of an ounce of potassium hydroxide aforementioned. It is purposely made weakly alkaline in order to prevent premature reaction between the iodide and iodate. This solution is then bottled in glass bottles of suitable size, and labeled with instructions for administering same to fowl. For instance, for administration through the drinking water, 1 to 2 ounces of the solution should be added to each 5 gallons of drinking water. If it is desired to administer same through the feed, 1 to 2 ounces of the solution should be incorporated in substantially every 10 pounds of dry or wet mash. Instead of the iodide and iodate of potassium, the iodide and iodate of sodium may be prepared and used, if desired. However, the potassium iodide and iodate are preferred as they are the most stable.

In place of producing the iodide and iodate of potassium in the manner described above, correct proportions of potassium iodide and iodate in chemically pure form may be directly mixed together, and same packaged in either dry or liquid form. For example, to make up a mixture of iodide and iodate of potassium in dry form, chemically pure potassium iodide and potassium iodate are mixed in the proportions of 19.85 ounces of the iodide to 5.12 ounces of the iodate. For administration to fowl through the drinking water, for every 5 gallons of drinking water from .2 to .4 ounce of such iodide-iodate dry mixture should be added thereto. If it is desired to administer through the feed, the aforesaid amount of the iodide-iodate mixture should be incorporated in substantially every 10 pounds of wet or dry mash. For preparing such mixture of iodide-iodate of potassium in liquid form, the potassium iodide and iodate are mixed together in dry form in the same proportions as above pointed out, whereupon the mixture is dissolved in water of an amount sufficient to bring the total volume to 1 gallon. The administration dosage of this solution whether to the drinking water or feed is the same as that above pointed out in connection with the solution produced from potassium hydroxide and iodine. It is to be understood that although iodide and iodate of potassium is preferred, this mixture can also be made from chemically pure iodide and iodate of sodium.

When the iodide-iodate mixture which has been introduced into the system of the fowl through the esophagus comes in contact with the gastric juices, the acidic reagent like hydrochloric acid present in such juices causes the constituents of the mixture to react together and liberate free iodine. The iodine thus liberated in turn is carried into the ceca and intestinal tract and acts to kill any coccidia or blackhead parasites that may be present.

As a preventative for coccidiosis in chicks, the iodide-iodate mixture should be preferably administered continuously from hatching time until they are about 16 weeks old. To prevent blackhead in young turkeys the iodide-iodate mixture should be administered for a period of 1 week in every month beginning when the turkeys are 6 weeks old. For mature fowl, such as chickens and turkeys, the iodide-iodate mixture should be administered for a period of about 10 days every month or two. Of course, should the flock of chickens or turkeys show any incipient signs of the blackhead or coccidiosis diseases, the administration should be started at once and continued for at least 2 weeks.

Having fully described the invention, what I claim as new and desire to secure by Letters Patent is:

1. An iodine generating composition suitable for administration to fowl through the esophagus consisting of an iodide of an alkali metal and an iodate of an alkali metal, the constituents of said mixture being adapted to react together and liberate free iodine upon contact with the acidic reagent present in the gastric juices of said fowl.

2. An iodine generating composition suitable for administration to fowl through the esophagus consisting of an iodide of potassium and iodate of potassium, the constituents of said mixture being adapted to react together and liberate free iodine upon contact with the acidic reagent present in the gastric juices of said fowl.

ELLIS L. WERFT.